United States Patent [19]

Jennings, Jr. et al.

[11] Patent Number: 4,838,351
[45] Date of Patent: Jun. 13, 1989

[54] PROPPANT FOR USE IN VISCOUS OIL RECOVERY

[75] Inventors: Alfred R. Jennings, Jr.; Lawrence R. Stowe, both of Plano, Tex.

[73] Assignee: Mobil Oil Corp., New York, N.Y.

[21] Appl. No.: 90,062

[22] Filed: Aug. 27, 1987

[51] Int. Cl.$^4$ .................... E21B 43/267; E21B 43/24
[52] U.S. Cl. .................................. 166/280; 166/271; 166/302
[58] Field of Search ............... 166/280, 271, 278, 302; 501/88, 33, 96, 97, 154; 428/402, 404, 406

[56] References Cited

U.S. PATENT DOCUMENTS

| | | | |
|---|---|---|---|
| 2,768,087 | 10/1956 | Bird | 501/88 |
| 3,175,616 | 3/1965 | Huitt et al. | 166/280 |
| 3,203,814 | 8/1965 | Muta et al. | 501/88 X |
| 3,205,944 | 9/1965 | Walton | 166/11 |
| 3,687,197 | 8/1972 | Redford | 166/271 X |
| 3,896,877 | 7/1975 | Vogt, Jr. et al. | 166/250 |
| 3,908,762 | 9/1975 | Redford | 166/271 X |
| 4,039,030 | 8/1977 | Godfrey et al. | 166/299 |
| 4,120,359 | 10/1978 | Harnsberger | 166/280 X |
| 4,547,468 | 10/1985 | Jones et al. | 501/33 |
| 4,549,608 | 10/1985 | Stowe et al. | 166/280 |
| 4,593,759 | 6/1986 | Penick | 166/261 |
| 4,598,770 | 7/1986 | Shu et al. | 166/245 |
| 4,632,876 | 12/1986 | Laird et al. | 501/89 X |
| 4,680,230 | 7/1987 | Gibb et al. | 166/271 X |

*Primary Examiner*—Bruce M. Kisliuk
*Attorney, Agent, or Firm*—Alexander J. McKillop; Charles J. Speciale; Charles A. Malone

[57] ABSTRACT

A fused refractory crystal for propping an induced fracture in a formation to obtain increased heat transfer. The crystal is of a size sufficient to keep said fracture open while providing for increased heat to be transferred into the formation. Increased heat is transferred into the formation via the crystal due to the substantially increased thermal conductivity capacity of the crystal. These crystals are particularly beneficial when used as proppants while fracturing a formation when a subsequent thermal oil recovery method is used. The efficiency of a thermal oil recovery method is substantially increased due to the ability of said crystals to conduct heat.

13 Claims, No Drawings

PROPPANT FOR USE IN VISCOUS OIL RECOVERY

FIELD OF THE INVENTION

This invention is directed to a method for fracturing a subterranean earth formation penetrated by at least one well wherein a high thermal conductivity proppant is utilized.

BACKGROUND OF THE INVENTION

Techniques for hydraulically fracturing subterranean formations by injecting a fracturing fluid down a well and into the formation under sufficient pressure to create fractures in a formation are well known. Proppant materials are generally entrained in the fracturing fluid and are deposited in the fracture to keep the fracture open.

After fracturing the formation, hydrocarbonaceous fluids are produced from the formation into the well. These produced fluids may carry sand entrained therein, particularly when the subsurface formation is an unconsolidated formation. Produced sand is undesirable form any reasons. It is abrasive to components found within the well, such as tubing, pumps and valves, and must be removed from the produced fluids at the surface. Further, produced sand may partially or completely clog the well, substantially inhibiting production, thereby making necessary an expensive workover. In addition, sand flowing from the subsurface formation may leave therein a cavity which may result in caving of the formation and collapse of a well casing.

Often after completion of hydraulic fracturing, a steam-flood or other heat generating method is used to heat the formation to remove hydrocarbonaceous fluids therefrom after having placed a proppant into the created fractures. Proppants utilized in this manner keep the created fractures from closing. They also assist in reducing undesired fines from being carried from the formation with the produced fluids. Also, proppants increase the permeability thereby allowing more intimate contact of the heating medium with the formation. Generally sand is used as a proppant. However, use of sand affords only a sufficient degree of heat conductivity.

Therefore, what is needed is a method for fracturing a formation wherein a proppant is utilized, which proppant, in addition to holding open the fractures created, also allows for greater heat conductivity into the formation so as to allow increased amounts of hydrocarbonaceous fluids to be removed from the formation.

SUMMARY

This invention is directed to a thermal oil recovery method for removing hydrocarbonaceous fluids from a formation wherein fracutres in said formation have been propesed with a fused refractory crystal or grain. Said crystal is of a size sufficient to keep said fracture open while providing for increased heat to be transferred to the formation. Increased heat is transferred into the formation via said crystal due to the crystal's substantially increased capacity to conduct heat. Fracture which are utilized can be made in the formation by any known fracturing method. However, hydraulic fracturing is particularly beneficial. While creating the fracture, the crystals or proppants are maintained in the fracturing fluid in an amount sufficient to obtain the desired fracturing and propping results. Once the fracturing operation is completed, the fracturing fluid dissipates and the fused refractory crystals keep the fractures open. Thereafter, a thermal oil recovery operation is commenced, preferably a steam-flood. Heat released by said oil recovery method is thereby more effectively transferred into the formation by said crystals. This more effective transfer of heat results in increased production of hydrocarbonaceous fluids.

It is therefore, an object of this invention to provide a novel proppant to be used in a fracture to allow for incresed heat transfer into a formation when a thermal oil recovery operation is utilized.

It is a further object of this invention to provide for a novel proppant which is stable in the formation when high temperatures are generated from a formation via a thermal oil recovery method.

It is a yet further object of the invention to provide for a novel proppant which will prolong the life and effectiveness of a created fracture.

DESCRIPTION OF THE PREFERRED EMBODIMENTS

In the practice of this invention, a fracturing method is utilized to induce fractures into a hydrocarbonaceous fluid bearing formation to increase its permeability. The crystals or grains of fused refractory material are placed into the fracturing fluid ("frac fluid") which will be utilized for fracturing said formation. Once the fused refractory material has been placed into the fracturing fluid in a desired amount to prop said formation, a desired fracturing method is utilized.

Fracturing methods which can be utilized include one method disclosed for creating radial fractures in a gas or oil bearing formation. One such method is described by Godfrey et al in U.S. Pat. 4,039,030 which issued on Aug. 2, 1977. This patent is hereby incorporated by reference. Another method which can be utilized to create the desired fractures is described in a hydraulic fracturing method by Stowe et al. in U.S. Pat. 4,549,608 which issued on Oct. 29, 1985. Yet another fracturing method which can be used is a hydraulic fracturing treatment method where propping material is scheduled into a formation. This method is described in U.S. Pat. No. 3,896,877 which issued to Vogt, Jr. et al. on July 29, 1975. This patent is hereby incorporated by reference. Once the method for creating fractures has been decided upon, the fused refractory grains or crystals are placed into the frac fluid in a desired amount.

A propping agent or fused refractory gravel concentration of about one pound per gallon can be used, though propping agents can be added in concentration varying from about 0.1 to about 8.0 pounds per gallon. In carrying out hydraulic fracturing treatments, it is a desired practice to first inject a fluid pad into the formation to initiate the fracture and thereafter to inject a very low concentration of propping agent or fused refractory material along with the frac fluid to ensure that the fracture has taken the propping agent or fused refractory material. As the fracture propagates into the formation and greater fracture area is created, increased amounts of frac fluid are lost to the formation. To account for this, the propping agent or refractory material concentration is decreased as the fracture is propagated into the formation. Thus the propping material concentration is greatest at the early part of the fracturing treatment and decreases to at least concentration near the end of the fracturing treatment.

As will be understood by those skilled in the art, the particular quantities of proppant carrying and low-leakoff fluids used will depend upon the type of formation being treated, the length of fracture desired in the formation and the width and capacity of the fractures desired. The greater the length of the desired fracture, the more graduated the concentration of proppant, the more low-leakoff fluid, and the finer the proppant. Therefore, the size of the fused refractory material or propping agent used depend on the type of fracture desired to be created.

The desire fused refractory material to be utilized herein comprises silicon carbide or silicon nitride. As is preferred, the size of the fused refractory material utilized should be from about 8 to about 100 U.S. Sieve. This fused refractory material should have a Mohs hardness of about 9. Both silicon carbide and silicon nitride have excellent thermal conductivity. Silicon nitride, for example, has a thermal conductivity of about 10.83 BTU/sq. ft/hr/°F. at 400° to 2400° F. A suitable silicon carbide material is sold under the trademark Crystolon® and can be purchased from Norton Company, Metals Division, Newton, Mass. A suitable silicon nitride material can also be purchased from Norton Company.

Having placed the refractory propping material into the frac fluid in the desired amount, fracturing is initiated and fractures are propagated in the formation. While propagating the fracture into the formation, the fused refractory material props the fractures open so as to make the formation more permeable and more amenable to receptivity of a thermal oil recovery process. Several methods can be utilized for heating the formation. The preferred method for heating the formation is to use a steam-flood. A thermal oil recovery process wherein steam is utilized to remove viscous oil from a formation which can be employed herein is described in U.S. Pat. No. 4,598,770. This patent issued to Shu et al on July 8, 1986 and is hereby incorporated by reference. Another thermal oil recovery method wherein steam is utilzed which can be employed herein is described in U.S. Pat. No. 4,593,759 and issued to Penick on June 10, 1986. Walton describes another thermal oil recovery process which can be used to recover hydrocarbonaceous fluids in U.S. Pat. No. 3,205,944. This patent issued on Sept. 14, 1965 and is hereby incorporated by reference. By this method hdyrocarbons within the formation are auto-oxidized. Auto-oxidation occurs at a relatively low rate and the exothermic heat of reaction heats up the formation by a slow release of heat. Since during auto-oxidation, the temperature within the formation can be the ignition temperature of the hydrocarbon material within said formation, the auto-oxidation reaction is controlled to prevent combustion of the hydrocarbon material within the formation. Heat generated by either of these methods is more effectively transferred into the formation via the fused refractory material used as a proppant herein. Since the fused refractory material used as a proppant herein allows for a more efficient transfer of heat into the formation, smaller volumes of steam can be utilized, for example, in a stream-filled process. Similarly, when using the auto-oxidation method to heat a formation, decreased amounts of oxygen can be used to obtain the same degree of heating within the formation. Once the formation has been heated to the desired degree, increased volumes of hydrocarbonaceous fluids can more effectively be produced to the surface from the formation.

Obviously, many other variations and modifications of this invention as previously set forth may be made without deparing from the spirit and scope of this invention as those skilled in the art readily understand. Such variations and modifications are considered part of this invention and within the purview and scope of the appended claims.

What is claimed is:

1. A method for propping a fracture in a formation where a fused refractory crystal provides for more effective heat transfer comprising:
    injecting into a fracture a fused refractory crystal which consists essentially of silicon carbide or silicon nitride having a Mohs hardness of about 9 and of a size sufficient to prop a fracture while providing substantially increased heat conductivity into a formation due to said crystal's substantially high degree of thermal conductivity.

2. The fused refractory crystal as recited in claim 1 where said crystal is of a size of about 8 to about 100 U.S.

3. The method as recited in claim 1 where said crystal has a thermal conductivity of about 10.83 Btu-/in/sq.ft/hr/°F. at about 400° F. to about 2400° F.

4. A method for recovering viscous oil from a formation having at least one well therein wherein a fused refractory proppant is used comprising:
    (a) injecting a fracturing fluid into said well under conditions sufficient to fracture said formation where said fluid contains therein a fused refractory proppant which consists essentially of silicon carbide having a Mohs hardness of about 9;
    (b) fracturing said formation and depositing into at least one fracture said proppant; and
    (c) generating heat in said formation which heat is tranferred into said formation in substantially increased amounts due to said proppant's substantially high degree of thermal conductivity.

5. The method as recited in claim 4 where after step (c) hydrocarbonaceous fluids are produced from said well.

6. The method as recited in claim 4 where said proppant is of a size of about 8 to about 100 U.S. sieve.

7. The method as recited in claim 4 where said proppant is used in combination with a thermal viscous oil recovery method.

8. The method as recited in claim 4 where said proppant has a thermal conductivity of about 10.83 Btu-/in/sq.ft/°F. at about 400° F. to about 2400° F.

9. A method for recovering viscous oil from a formation having at least one well therein wherein a fused refractory proppant is used comprising:
    (a) injecting a fracturing fluid into said well under conditions sufficient to fracture said formation where said fluid contains therein a fused refractory proppant which consists essentially of silicon nitride having a Mohs hardness of about 9;
    (b) fracturing said formation and depositing into at least one fracture said proppant; and
    c) generating heat in said formation which heat is transferred into said formation in substantially increased amounts due to said proppant's substantially high degree of thermal conductivity.

10. The method as recited in claim 9 where after step (c) hydrocarbonaceous fluids are produced from said well.

11. The method as recited in claim 9 where said proppant is of a size of about 8 to about 100 U.S. sieve.

12. The method as recited in claim 9 where said proppant is used in combination with a thermal viscous oil recovery method.

13. The method as recited in claim 9 where said proppant has a thermal conductivity of about 10.83 Btu-/in/sq.ft/hr/°F. at about 400° F. to about 2400° F.

* * * * *

UNITED STATES PATENT AND TRADEMARK OFFICE
CERTIFICATE OF CORRECTION

PATENT NO. : 4,838,351

DATED : June 13, 1989

INVENTOR(S) : Alfred R. Jennings, Jr. et al.

It is certified that error appears in the above-identified patent and that said Letters Patent is hereby corrected as shown below:

Column 1, line 24, delete "form any" and insert --for many--.
Column 1, line 56, delete "fracutres" and insert --fractures--.
Column 1, line 57, delete "propesed" and insert --propped--.
Column 2, line 11, delete "incresed" and insert --increased--.
Column 2, line 67, delete "at" and insert --a--.
Column 3, line 19, insert --in/-- after "BTU".
Column 3, line 39, delete "utilzed" and insert --utilized--.
Column 3, line 67, delete "deparing" and insert --departing--.
Column 4, line 16, insert --sieve-- after "U.S."

Signed and Sealed this

Fifth Day of June, 1990

Attest:

HARRY F. MANBECK, JR.

*Attesting Officer*   Commissioner of Patents and Trademarks